United States Patent
Ito

(10) Patent No.: US 12,479,244 B2
(45) Date of Patent: Nov. 25, 2025

(54) PNEUMATIC TIRE

(71) Applicant: Sumitomo Rubber Industries, Ltd., Kobe (JP)

(72) Inventor: Shunsuke Ito, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 6 days.

(21) Appl. No.: 18/431,216

(22) Filed: Feb. 2, 2024

(65) Prior Publication Data

US 2024/0278603 A1 Aug. 22, 2024

(30) Foreign Application Priority Data

Feb. 22, 2023 (JP) ................. 2023-026475

(51) Int. Cl.
*B60C 13/00* (2006.01)

(52) U.S. Cl.
CPC .................. *B60C 13/001* (2013.01)

(58) Field of Classification Search
CPC ........ B60C 13/00; B60C 13/001; B60C 13/02
See application file for complete search history.

(56) References Cited

U.S. PATENT DOCUMENTS

| | | | |
|---|---|---|---|
| 2010/0051159 A1* | 3/2010 | Fujioka | B60C 13/001 152/523 |
| 2016/0152095 A1* | 6/2016 | Berger | B60C 13/04 152/524 |
| 2019/0263190 A1* | 8/2019 | Nakajima | B60C 13/02 |
| 2022/0055415 A1* | 2/2022 | Nakajima | B60C 13/001 |
| 2022/0055416 A1* | 2/2022 | Nakajima | B60C 13/001 |
| 2022/0339970 A1* | 10/2022 | Sato | B60C 13/001 |

FOREIGN PATENT DOCUMENTS

| | | | | |
|---|---|---|---|---|
| EP | 3698989 A1 * | 8/2020 | | B60C 13/001 |
| JP | 2020-131906 A | 8/2020 | | |

* cited by examiner

*Primary Examiner* — Robert C Dye
(74) *Attorney, Agent, or Firm* — Birch, Stewart, Kolasch & Birch, LLP

(57) ABSTRACT

A pneumatic tire is provided with a mark portion raised from a surface of at least one of side portions. A first region demarcated on the mark portion side of a boundary position between the mark portion and the surface of the at least one of the side portions is provided with a plurality of micro protrusions each having a raised height smaller than a raised height of the mark portion and a second region demarcated on the surface-of-the-at-least-one-of-the-side-portions side of the boundary position is not provided with the micro protrusions.

20 Claims, 6 Drawing Sheets

PNEUMATIC TIRE

RELATED APPLICATIONS

This application claims the benefit of foreign priority to Japanese Patent Applications No. JP2023-026475, filed Feb. 22, 2023, which are incorporated by reference in its entirety.

FIELD OF THE INVENTION

The present disclosure relates to a pneumatic tire.

BACKGROUND OF THE INVENTION

The following Patent Document 1 describes a tire with a non-decorated portion and a decorated portion on an outer surface of the tire. The non-decorative portion is a raised portion raised from the outer surface and is formed as a mark. The decorative portion is arranged with a plurality of micro protrusions. This is said to increase the contrast between the decorative portion and the non-decorative portion and improve the visibility of the non-decorative portion.

PATENT DOCUMENT

Patent Document 1

Japanese Unexamined Patent Application Publication No. 2020-131906

SUMMARY OF THE INVENTION

Problems to be Solved by the Invention

In recent years, it has been desired to enhance the appearance of the mark by making it stand out from the surface of the side portion.

The present disclosure was made in view of the above, and a primary object thereof is to provide a pneumatic tire capable of improving the appearance of the mark portion.

Means for Solving the Problems

The present disclosure is a tire including a tread portion; a pair of side portions extending inward in a tire radial direction from the tread portion; a mark portion raised from a surface of at least one of the side portions and including a letter, a symbol, or a figure; a boundary position between the mark portion and the surface of the at least one of the side portions; a plurality of micro protrusions having a raised height smaller than a raised height of the mark portion; a first region demarcated on the mark portion side of the boundary position and provided with the micro protrusions; and a second region demarcated on the surface-of-the-at-least-one-of-the-side-portions side of the boundary position and not provided with the micro protrusions.

Effects of the Invention

It is possible that the pneumatic tire of the present disclosure improves the appearance of the mark portion by adopting the above configuration.

DETAILED DESCRIPTION OF THE INVENTION

An embodiment of the present disclosure will now be described in conjunction with accompanying drawings. The drawings contain exaggerations and representations different from the actual dimensional ratios of the structure to aid in the understanding of the present disclosure. Further, in the case where there are multiple embodiments, identical or common elements will be assigned with the same reference sign throughout the specification, and redundant explanations will be omitted.

Figure 1:
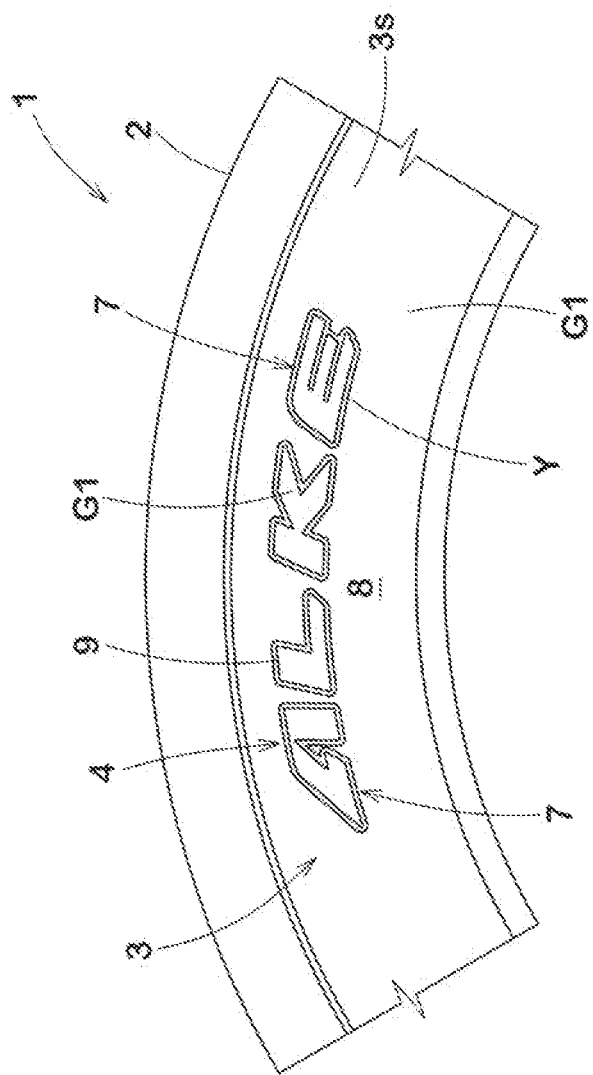
FIG. 1 is a partial side view of a pneumatic tire showing an embodiment of the present disclosure.

FIG. 1 is a partial side view of a pneumatic tire 1 (hereinafter simply referred to as "tire 1") showing an embodiment of the present disclosure. FIG. 1 is a partial side view of the tire 1 (hereinafter referred to simply as "Tire 1"). The tire 1 of the present embodiment is suitably used for passenger cars, for example. However, the present disclosure may be applied to the tire 1 for motorcycles or for heavy duty, for example.

In the present specification, unless otherwise noted, the dimensions and the like of various parts of the tire 1 are the values measured under the standard state. In the case of pneumatic tires for which various standards have been established, the term "standard state" refers to a state in which the tire 1 is mounted on the standard rim (not shown), inflated to the standard inner pressure, and loaded with no tire load. In the case of tires for which various standards have not been established, the standard state refers to a standard use state according to the purpose of use of the tire and being unmounted to a vehicle and loaded with no tire load.

The term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The term "standard inner pressure" refers to air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 of the present embodiment includes a tread portion 2 and a pair of side portions 3 extending from the tread portion 2 inwardly in the tire radial direction. FIG. 1 shows one of the side portions 3.

At least one of the pair of the side portions 3 is provided with a mark portion 4 containing letters, symbols, or figures that rise from a surface (3s) of the side portion 3. The mark portion 4 is formed on both of the pair of the side portions 3, for example. The mark portion 4 consists of the four letters "A", "L", "K", and "E" in the present embodiment. It should be noted that the mark portion 4 is not limited to such a manner.

The surface (3s) of the side portions 3 and the mark portion 4 are formed of rubber G1. The rubber G1 is manufactured from known rubber materials. It should be noted that the rubber G1 is black rubber in the present embodiment, although it is not limited to this. Further, the mark portion may include rubber material of different color from black.

Figure 2:
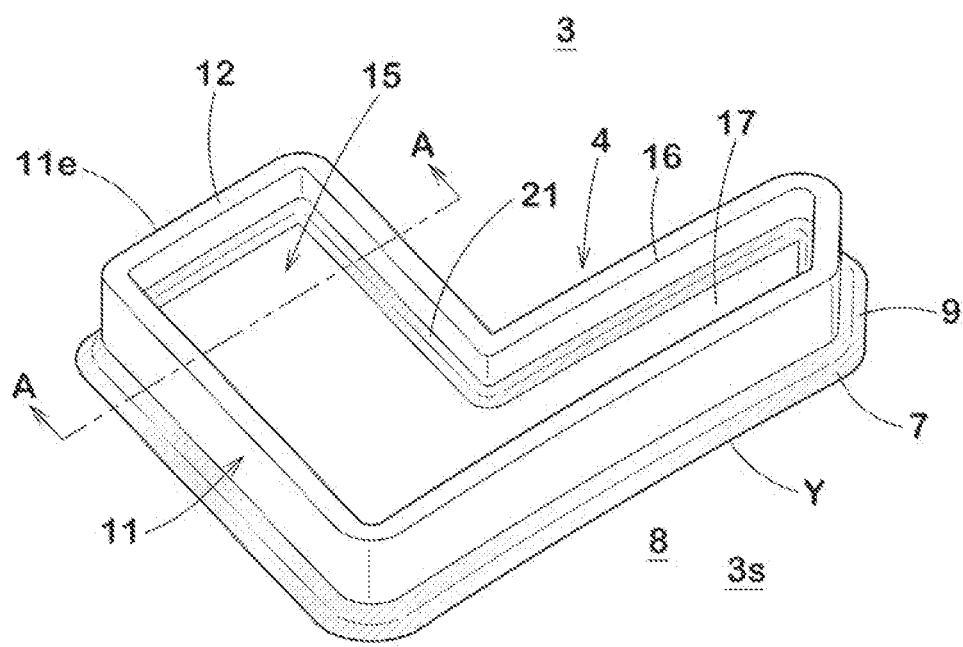
FIG. 2 is a perspective view of a mark portion in the present embodiment.
Figure 3:
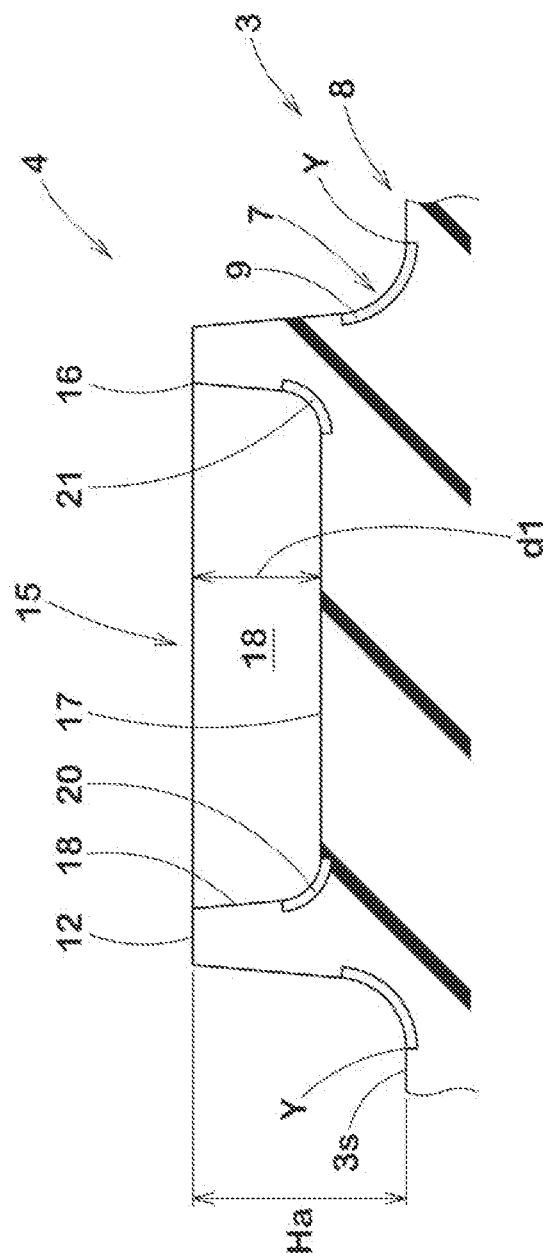
FIG. 3 is a cross section taken along the A-A line of FIG. 2.

FIG. 2 is a perspective view of the letter "L" which is one of the letters that make up mark portion 4, and FIG. 3 is a cross section taken along the A-A line of FIG. 2. As shown in FIGS. 1 through 3, the side portion 3 include a boundary position (Y) between the surface (3s) of the side portion 3 and the mark portion 4, a first region 7 on the side of the mark portion 4 from the boundary position (Y), and a second region 8 on the side of the surface (3s) of the side portion 3 from the boundary position (Y). In the first region 7, a plurality of micro protrusions 9 each having a raised height smaller than a raised height of the mark portion 4 is formed. The micro protrusions 9 suppress diffuse reflection of the irradiated light, therefore, the blackness of the first region 7 is increased. In addition, the micro protrusions 9 are not formed in the second region 8. As a result, the blackness of the second region 8 is smaller than the blackness of the first region 7. Thereby, the appearance of the mark portion 4 is improved by the surface (3s) of the side portion 3 being clearly distinguished from the mark portion 4, which also makes the mark portion 4 appear to stand out higher or more three-dimensionally. For convenience, the first region 7 where a plurality of the micro protrusions 9 is formed is shaded in FIGS. 1 through 4 and FIG. 6.

A raised height (Ha) of the mark portion 4 is preferably 3 mm or more, more preferably 4 mm or more, and preferably 7 mm or less, more preferably 6 mm or less, for example. Thereby, the mark portion 4 becomes more visible and damage to the mark portion 4 can be suppressed.

The surface (3s) of the side portion 3 in the present embodiment is formed with a smooth surface facing outward in the tire axial direction. It should be noted that the surface (3s) of the side portion 3 can be formed with a well-known serration pattern (not shown) consisting of a plurality of grooves and ridges arranged between adjacent grooves.

The first region 7 is formed over the entire circumference of the mark portion 4, and in the present embodiment, over the entire circumference of each of the letters, for example. In other words, the micro protrusions 9 are provided around the entire circumference of each of the letters in the present embodiment.

Figure 4:
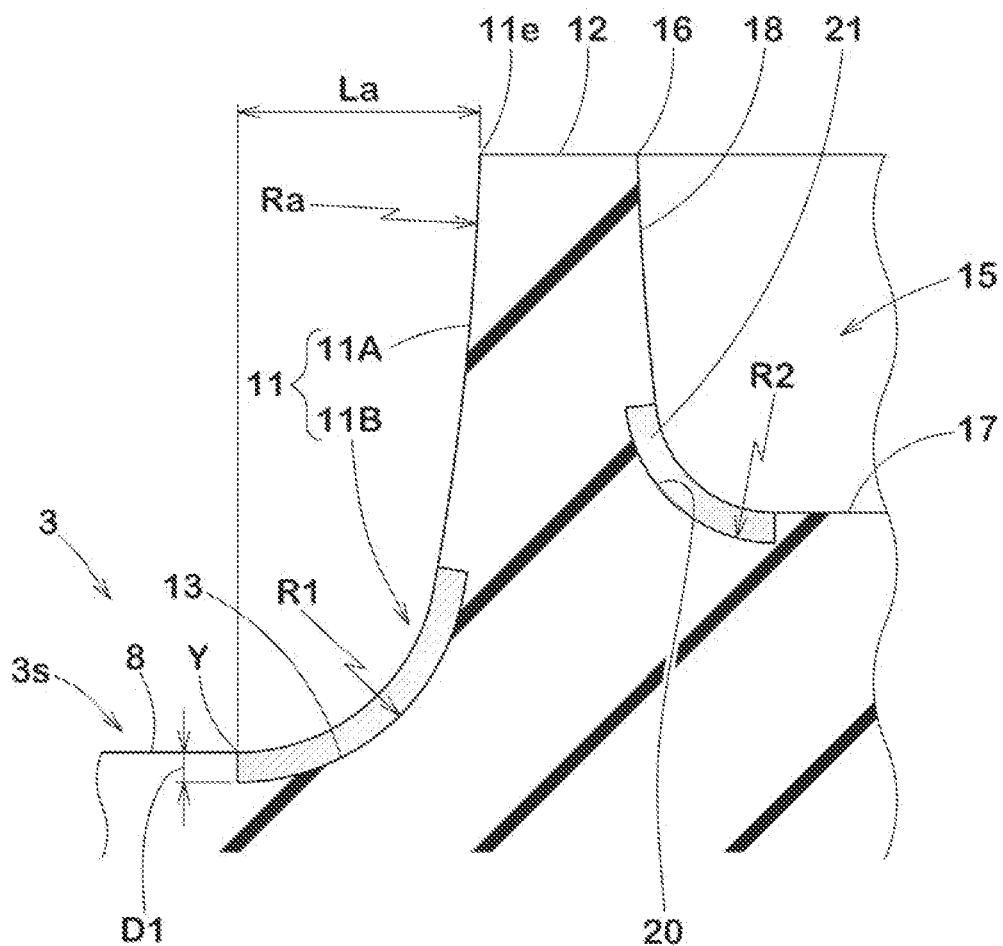
FIG. 4 is an enlarged view of FIG. 3.

FIG. 4 is an enlarged view of FIG. 3. As shown in FIG. 2 or FIG. 4, the mark portion 4 includes a sidewall surface 11 rising from the surface (3s) of the side portion 3 and an outward surface 12 facing outward in the tire axial direction. The outward surface 12 is connected to an outer edge (11e) in the tire axial direction of the sidewall surface 11, for example. The first region 7 is not formed on the outward surface 12 in the present embodiment.

The boundary position (Y) is an outer edge (raised edge) of the mark portion 4 that rises from the surface (3s) of the side portion 3 if it can be clearly identified. Further, the boundary position (Y) is defined as the position where a shortest distance (La) from the outer edge (11e) is 5 mm in a plan view of the side portion 3, if the outer edge (raised edge) of the mark portion 4 cannot be clearly identified.

The second region 8 surrounds the entire circumference of the boundary position (Y) of the mark portion 4, for example. The second region 8 is formed continuously between the boundary positions (Y) of the adjacent mark portions 4 in the present embodiment.

The sidewall surface 11 includes a planar portion 11A and an arcuate surface 11B connecting the planar portion 11A and the boundary position (Y). The planar portion 11A includes a mode formed with a flat surface as well as that with a radius of curvature (Ra) exceeding 8.0 mm. The arcuate surface 11B prevents loads acting on the mark portion 4 from concentrating at the base of the mark portion 4, thereby reducing damage to the mark portion 4 and further enhancing its appearance. FIGS. 3 and 4 are also cross sections orthogonal to the sidewall surface 11 and the surface (3s) of the side portion 3.

The first region 7 is formed on the arcuate surface 11B in the present embodiment. The arcuate surface 11B is the area where the amount of light irradiated is less compared to the surface (3s). The micro protrusions 9 formed on the arcuate surface 11B configured as such further increase the blackness of the arcuate surface 11B, therefore, the appearance (i.e., visibility) of the mark portion 4 is further improved.

The first region 7 is provided within the arcuate surface 11B, for example. In other words, the first region 7 is not provided in the planar portion 11A in the present embodiment. As a result, the blackness of the arcuate surface 11B is greater than the blackness of the planar portion 11A, which makes them clearly distinguishable and thus further improves the appearance of the mark portion 4. It is preferred that the first region 7 is provided over the entire range of the arcuate surface 11B, for example. It should be noted that the first region 7 may be provided in the arcuate surface 11B and the planar portion 11A. Such an embodiment increases the overall blackness of the sidewall surface 11.

It is preferred that a radius of curvature R1 of the arcuate surface 11B is 2.0 mm or more. As a result, the number of the micro protrusions 9 arranged on the arcuate surface 11B is ensured, and thus the effect of increasing blackness is exerted. Further, the effect of increasing the rigidity of the mark portion 4 is exerted. If the radius of curvature R1 of the arcuate surface 11B is excessively large, the micro protrusions 9 formed on the arcuate surface 11B will be noticeable, which may deteriorate the appearance performance. Therefore, the radius of curvature R1 of the arcuate surface 11B is more preferably 2.5 mm or more, and preferably 8.0 mm or less, and more preferably 5.0 mm or less.

Figure 5A:
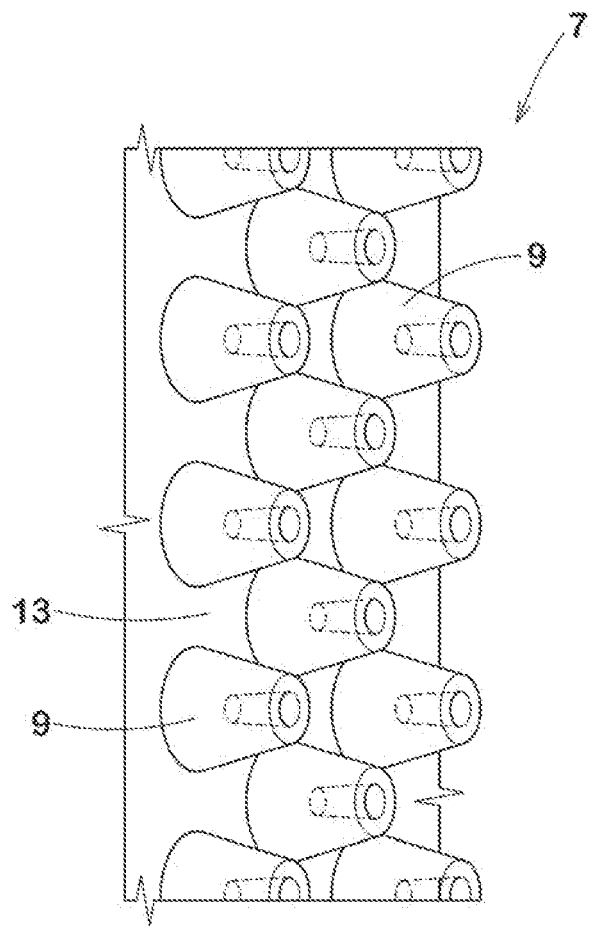
FIG. 5A is an enlarged perspective view of a first region.
Figure 5B:
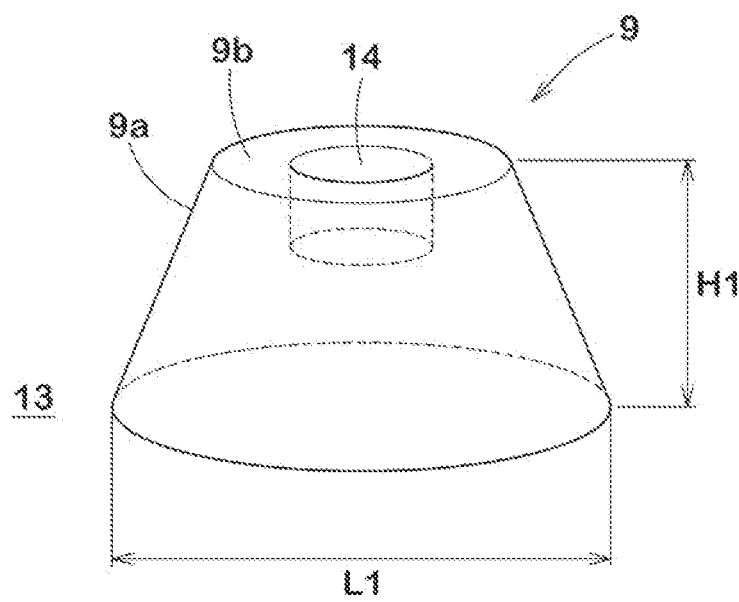
FIG. 5B is a perspective view of one of micro protrusions.

FIG. 5A is an enlarged perspective view of the first region 7 and FIG. 5B is a perspective view of one of the micro protrusions 9 in the present embodiment. As shown in FIG. 5A, the first region 7 is formed by a plurality of the micro protrusions 9 and a joint surface 13 that connects the micro protrusions 9 to each other. The joint surface 13 is located inside the mark portion 4 (i.e., recessed) than the planar portion 11A and the surface (3s), for example. This makes the shape of the micro protrusions 9 themselves less noticeable. In the present specification, the radius of curvature R1 of the arcuate surface 11B is identified at the joint surface 13. It should be noted that the joint surface 13 may be smoothly connected to the planar portion 11A and the surface (3s) (this embodiment not shown).

The micro protrusions 9 are formed as truncated cones. As a result, even when a load is applied to the arcuate surface 11B, damage caused by contact between the micro protrusions 9 formed on the arcuate surface 11B can be suppressed, and thus the effect of improving the appearance of the mark portion 4 can be exerted for a long time. In addition, this type of the micro protrusions 9 facilitates the separation between the tire 1 and the tire vulcanization mold of the well-known structure during vulcanization molding. Each of the micro protrusions 9 includes a side surface (9a) tapered in a direction away from the joint surface 13, and a top surface (9b) connected to the side surface 9a, for example. Each of the micro protrusions 9 of the present embodiment further includes a recessed portion 14 recessed from the top surface (9b). The micro protrusions 9 configured as such help to further increase the blackness. It should be noted that the micro protrusions 9 are not limited to such an embodiment, and may have a truncated cone shape without the recessed portion 14, or a conical shape formed only with the side surface (9a) without the top surface (9b) (not shown). Further, the top surface (9b) is not limited to a flat surface, but may be formed as an arcuate surface convex outward in the tire axial direction depending on manufacturing precision (not shown).

A maximum diameter L1 of each of the micro protrusions 9 is preferably 0.1 mm or more, more preferably 0.15 mm or more, and preferably 0.5 mm or less, more preferably 0.45 mm or less. Since the maximum diameter L1 of each of the micro protrusions 9 is 0.1 mm or more, the effect of suppressing rubber flow is highly exhibited, therefore, the appearance of the mark portion 4 can be improved. Since the maximum diameter L1 of each of the micro protrusions 9 is 0.5 mm or less, the micro protrusions 9 are less noticeable and the appearance can be maintained high. In order to effectively exert such an effect, a raised height H1 of each of the micro protrusions 9 is preferably 0.1 mm or more, more preferably 0.15 mm or more, and preferably 0.5 mm or less, more preferably 0.45 mm or less. Furthermore, it is preferred that the micro protrusions 9 are provided at a density of 2 to 10 per $mm^2$ of the first region 7.

In order to make the shape of the micro protrusions 9 less noticeable and to enhance the appearance of the mark portion 4, it is preferred that the raised height H1 of each of the micro protrusions 9 is the same as a shortest distance D1 between the joint surface 13 and the surface (3s).

As shown in FIGS. 2 to 4, the mark portion 4 further includes a recessed portion 15 formed in the outward surface 12 in the present embodiment. The recessed portion 15 includes an opening edge 16, a bottom surface 17, and an inner wall surface 18 extending from the opening edge 16 toward the bottom surface 17. The opening edge 16 extends along the outer edge (11e) of the sidewall surface 11 in the present embodiment. As a result, in the present embodiment, the mark portion 4 is formed in a so-called open face that traces the outline (outer edge (11e)) of the outward surface 12. The bottom surface 17 extends substantially parallel to the outward surface 12, for example. In the present embodiment, the bottom surface 17 is located axially outside the surface (3s) of the side portion 3. In other words, the recessed portion 15 is formed to have a depth (d1) smaller than the raised height (Ha) of the mark portion 4. The recessed portion 15 configured as such suppresses a large decrease in the rigidity of the mark portion 4 and thereby suppresses damage to the mark portion 4.

In a cross section perpendicular to the bottom surface 17, the bottom surface 17 and the inner wall surface 18 are connected via an inner arcuate surface 20. A plurality of micro protrusions 21 is formed on the inner arcuate surface 20. Therefore, the blackness of the inner arcuate surface 20 is increased, thereby, the appearance of the mark portion 4 is further improved. The cross section perpendicular to the bottom surface 17 is the same as the cross section perpendicular to the sidewall surface 11 and the surface (3s), for example. FIGS. 3 and 4 are also cross sections perpendicular to the bottom surface 17.

The inner arcuate surface 20 has a smaller separation distance from the outward surface 12 than the arcuate surface 11B, therefore, smaller stress is generated than the stress generated in the arcuate surface 11B. Further, the smaller a radius of curvature R2 of the inner arcuate surface 20, the more clearly the bottom surface 17 and the inner wall surface 18 can be distinguished. Therefore, it is preferred that the radius of curvature R2 of the inner arcuate surface 20 is smaller than the radius of curvature R1 of the arcuate surface 11B. Although not particularly limited, the radius of curvature R2 of the inner arcuate surface 20 is preferably 1.5 mm or more, more preferably 2.0 mm or more, and preferably 7.0 mm or less, more preferably 4.0 mm or less.

It is preferred that the micro protrusions 21 have the same shape (not shown) or the same size as the micro protrusions 9. Thereby, the effect of increasing the blackness of the inner arcuate surface 20 is effectively exerted. In the present embodiment, the micro protrusions 21 have the same shape and the same size as the micro protrusions 9.

Figure 6:
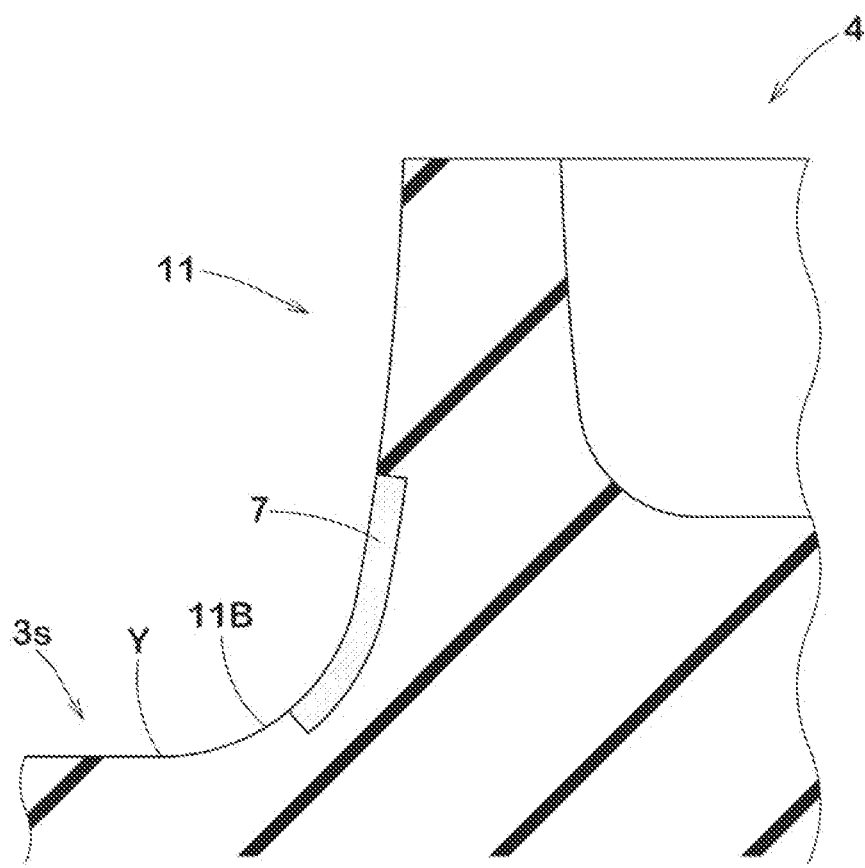
FIG. 6 is a cross section of the mark portion in another embodiment.

FIG. 6 is a cross-sectional view orthogonal to the surface (3s) of the side portion 3 and the sidewall surface 11 in another embodiment. As shown in FIG. 6, in the present embodiment, the first region 7 is provided only on a part of the arcuate surface 11B that is separated (i.e., spaced apart) from the boundary position (Y) toward the mark portion 4 side. In other words, the first region 7 is not provided in an area of the arcuate surface immediately adjacent to the boundary position (Y), i.e., the micro protrusions 9 are not provided in the area of the arcuate surface immediately adjacent to the boundary position (Y). Even in such an embodiment, the appearance of the mark portion 4 is improved because the mark portion 4 and the surface (3s) of the side portion 3 can be easily distinguished by the effect of increasing the blackness by the first region 7.

While detailed description has been made according to an especially preferred embodiment of the present disclosure, the present disclosure can be embodied in various forms without being limited to the illustrated embodiment.

Statement of Disclosure

The present disclosure includes the following aspects.

Present Disclosure 1

A pneumatic tire including:
a tread portion;
a pair of side portions extending inward in a tire radial direction from the tread portion;
a mark portion raised from a surface of at least one of the side portions and including a letter, a symbol, or a figure;
a boundary position between the mark portion and the surface of the at least one of the side portions;
a plurality of micro protrusions having a raised height smaller than a raised height of the mark portion;
a first region demarcated on the mark portion side of the boundary position and provided with the micro protrusions; and
a second region demarcated on the surface-of-the-at-least-one-of-the-side-portions side of the boundary position and not provided with the micro protrusions.

Present Disclosure 2

The pneumatic tire according to Present Disclosure 1, wherein the micro protrusions are conical or truncated conical.

Present Disclosure 3

The pneumatic tire according to Present Disclosure 2, wherein the micro protrusions have a maximum diameter of 0.1 mm or more and 0.5 mm or less and the raised height of 0.1 mm or more and 0.5 mm or less.

Present Disclosure 4

The pneumatic tire according to Present Disclosure 1, wherein
the mark portion includes a sidewall surface rising from the surface of the at least one of the side portions,
the sidewall surface includes a planar portion and an arcuate surface connecting the planar portion and the boundary position in a cross section perpendicular to the sidewall surface and the surface of the at least one of the side portions, and
the first region is formed on the arcuate surface.

Present Disclosure 5

The pneumatic tire according to Present Disclosure 4, wherein the first region is provided within the arcuate surface.

Present Disclosure 6

The pneumatic tire according to Present Disclosure 4 or 5, wherein the arcuate surface has a radius of curvature of 2.0 mm or more.

Present Disclosure 7

The pneumatic tire according to Present Disclosure 1, wherein
the mark portion includes a sidewall surface rising from the surface of the at least one of the side portions, an outward surface facing outward in a tire axial direction, and a recessed portion formed in the outward surface,
the recessed portion includes an opening edge, a bottom surface, and an inner wall surface extending from the opening edge toward the bottom surface,
the bottom surface and the inner wall surface are connected via an inner arcuate surface in a cross section perpendicular to the bottom surface, and
the inner arcuate surface is provided with a plurality of micro protrusions.

Present Disclosure 8

The pneumatic tire according to Present Disclosure 7, wherein the opening edge extends along an outer edge in the tire axial direction of the sidewall surface.

Present Disclosure 9

The pneumatic tire according to Present Disclosure 1, wherein the first region is formed over the entire circumference of the mark portion.

Present Disclosure 10

The pneumatic tire according to Present Disclosure 4, wherein the first region is provided over the entire range of the arcuate surface.

Present Disclosure 11

The pneumatic tire according to Present Disclosure 4, wherein the first region is not formed in the planar portion.

Present Disclosure 12

The pneumatic tire according to Present Disclosure 4, wherein the first region is formed in the planar portion.

Present Disclosure 13

The pneumatic tire according to Present Disclosure 1, wherein
the first region is formed by the micro protrusions and a joint surface connecting the micro protrusions to each other, and
the joint surface is recessed from the planar portion and the surface of the at least one of the side portions.

Present Disclosure 14

The pneumatic tire according to Present Disclosure 13, wherein each of the micro protrusions includes a side surface tapered in a direction away from the joint surface, a top surface connected to the side surface, and a recessed portion 14 recessed from the top surface.

Present Disclosure 15

The pneumatic tire according to Present Disclosure 13, wherein the raised height of the micro protrusions is the same as a shortest distance between the joint surface and the surface of the at least one of the side portions.

Present Disclosure 16

The pneumatic tire according to Present Disclosure 1, wherein the micro protrusions are provided at a density of 2 to 10 per $mm^2$ of the first region.

Present Disclosure 17

The pneumatic tire according to Present Disclosure 7, wherein the bottom surface is located axially outside the surface of the at least one of the side portions.

Present Disclosure 18

The pneumatic tire according to Present Disclosure 7, wherein
the sidewall surface includes a planar portion and an arcuate surface connecting the planar portion and the boundary position in a cross section perpendicular to the sidewall surface and the surface of the at least one of the side portions, and
the inner arcuate surface has a radius of curvature smaller than a radius of curvature of the arcuate surface.

Present Disclosure 19

The pneumatic tire according to Present Disclosure 7, wherein the micro protrusions of the inner arcuate surface have the same shape or the same size as the micro protrusions of the arcuate surface.

Present Disclosure 20

The pneumatic tire according to Present Disclosure 1, wherein the first region is formed only on a part of the arcuate surface spaced apart from the boundary position toward the mark portion side.

DESCRIPTION OF REFERENCE SIGNS 1 pneumatic tire
3 side portion
3s surface
4 mark portion
7 first region
8 second region
9 micro protrusion
G1 rubber
Y boundary position

The invention claimed is:
1. A pneumatic tire comprising:
a tread portion;
a pair of side portions extending inward in a tire radial direction from the tread portion;
a mark portion raised from a surface of at least one of the side portions and including a letter, a symbol, or a figure;
a boundary position between the mark portion and the surface of the at least one of the side portions;
a plurality of first micro protrusions having a raised height smaller than a raised height of the mark portion;
a first region demarcated on the mark portion side of the boundary position and provided with the first micro protrusions; and
a second region demarcated on the surface-of-the-at-least-one-of-the-side-portions side of the boundary position and not provided with the first micro protrusions, wherein
the mark portion includes a sidewall surface rising from the surface of the at least one of the side portions, an outward surface facing outward in a tire axial direction, and a recessed portion formed in the outward surface,
the sidewall surface includes a planar portion and an arcuate surface connecting the planar portion and the boundary position in a cross section perpendicular to the sidewall surface and the surface of the at least one of the side portions,
the first region is formed on the arcuate surface,
the recessed portion includes an opening edge, a bottom surface, and an inner wall surface extending from the opening edge toward the bottom surface,
the bottom surface and the inner wall surface are connected via an inner arcuate surface in a cross section perpendicular to the bottom surface,
the inner arcuate surface is provided with a plurality of second micro protrusions,
the first region is formed by the first micro protrusions and a joint surface connecting the first micro protrusions to each other, and
the joint surface is recessed from the planar portion and the surface of the at least one of the side portions.

2. The pneumatic tire according to claim 1, wherein at least one of the first micro protrusions and the second micro protrusions are conical or truncated conical.

3. The pneumatic tire according to claim 2, wherein at least one of the first micro protrusions and the second micro protrusions have a maximum diameter of 0.1 mm or more and 0.5 mm or less and the raised height of 0.1 mm or more and 0.5 mm or less.

4. The pneumatic tire according to claim 1, wherein the first region is provided within the arcuate surface.

5. The pneumatic tire according to claim 1, wherein the arcuate surface has a radius of curvature of 2.0 mm or more.

6. The pneumatic tire according to claim 1, wherein the opening edge extends along an outer edge in the tire axial direction of the sidewall surface.

7. The pneumatic tire according to claim 1, wherein the first region is formed over the entire circumference of the mark portion.

8. The pneumatic tire according to claim 1, wherein the first region is provided over the entire range of the arcuate surface.

9. The pneumatic tire according to claim 1, wherein the first region is not formed in the planar portion.

10. The pneumatic tire according to claim 1, wherein the first region is formed in the planar portion.

11. The pneumatic tire according to claim 1, wherein each of at least one of the first micro protrusions and the second micro protrusions includes a side surface tapered in a direction away from the joint surface, a top surface connected to the side surface, and a recessed portion recessed from the top surface.

12. The pneumatic tire according to claim 1, wherein the raised height of at least one of the first micro protrusions and the second micro protrusions is the same as a shortest distance between the joint surface and the surface of the at least one of the side portions.

13. The pneumatic tire according to claim 1, wherein at least one of the first micro protrusions and the second micro protrusions are provided at a density of 2 to 10 per $mm^2$ of the first region.

14. The pneumatic tire according to claim 1, wherein the bottom surface is located axially outside the surface of the at least one of the side portions.

15. The pneumatic tire according to claim 1, wherein
the sidewall surface includes a planar portion and an arcuate surface connecting the planar portion and the boundary position in a cross section perpendicular to the sidewall surface and the surface of the at least one of the side portions, and
the inner arcuate surface has a radius of curvature smaller than a radius of curvature of the arcuate surface.

16. The pneumatic tire according to claim 1, wherein the second micro protrusions of the inner arcuate surface have the same shape or the same size as the first micro protrusions of the arcuate surface.

17. The pneumatic tire according to claim 1, wherein the first region is formed only on a part of the arcuate surface spaced apart from the boundary position toward the mark portion side.

18. A pneumatic tire comprising:
a tread portion;
a pair of side portions extending inward in a tire radial direction from the tread portion;
a mark portion raised from a surface of at least one of the side portions and including a letter, a symbol, or a figure;
a boundary position between the mark portion and the surface of the at least one of the side portions;
a plurality of first micro protrusions having a raised height smaller than a raised height of the mark portion;
a first region demarcated on the mark portion side of the boundary position and provided with the first micro protrusions; and
a second region demarcated on the surface-of-the-at-least-one-of-the-side-portions side of the boundary position and not provided with the first micro protrusions, wherein the mark portion includes a sidewall surface rising from the surface of the at least one of the side portions, an outward surface facing outward in a tire axial direction, and a recessed portion formed in the outward surface, the recessed portion includes an opening edge, a bottom surface, and an inner wall surface extending from the opening edge toward the bottom surface, the bottom surface and the inner wall surface are connected via an inner arcuate surface in a cross section perpendicular to the bottom surface, the inner arcuate surface is provided with a plurality of second micro protrusions, and the outward surface is not provided with the first micro protrusions.

19. A pneumatic tire comprising:

a tread portion;

a pair of side portions extending inward in a tire radial direction from the tread portion;

a mark portion raised from a surface of at least one of the side portions and including a letter, a symbol, or a figure;

a boundary position between the mark portion and the surface of the at least one of the side portions;

a plurality of micro protrusions having a raised height smaller than a raised height of the mark portion;

a first region demarcated on the mark portion side of the boundary position and provided with the micro protrusions; and a second region immediately adjacent to the boundary position, demarcated on the surface-of-the-at-least-one-of-the-side-portions side of the boundary position, and not provided with the micro protrusions, wherein the mark portion includes a sidewall surface rising from the surface of the at least one of the side portions and an outward surface facing outward in a tire axial direction, the sidewall surface includes a planar portion continuous with the outward surface and an arcuate surface extending from the planar portion to the boundary position in a cross section perpendicular to the sidewall surface and the surface of the at least one of the side portions, the arcuate surface is provided with the micro protrusions, and the outward surface is not provided with the micro protrusions.

20. The pneumatic tire according to claim 19, wherein the boundary position is a point where a curvature of the arcuate surface ends to coincide with the surface of the at least one of the side portions in the cross section perpendicular to the sidewall surface and the surface of the at least one of the side portions.

* * * * *